US010844641B2

(12) United States Patent
Schiffer et al.

(10) Patent No.: US 10,844,641 B2
(45) Date of Patent: Nov. 24, 2020

(54) VEHICLE LOCK

(71) Applicant: Kiekert Aktiengesellschaft, Heiligenhaus (DE)

(72) Inventors: Holger Schiffer, Meerbusch (DE); Omer Inan, Dorsten (DE); Michael Scholz, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 698 days.

(21) Appl. No.: 14/647,463

(22) PCT Filed: Nov. 23, 2013

(86) PCT No.: PCT/DE2013/000705
§ 371 (c)(1),
(2) Date: May 27, 2015

(87) PCT Pub. No.: WO2014/082620
PCT Pub. Date: Jun. 5, 2014

(65) Prior Publication Data

US 2015/0337573 A1 Nov. 26, 2015

(30) Foreign Application Priority Data

Nov. 29, 2012 (DE) ........................ 10 2012 023 261

(51) Int. Cl.
*E05B 85/24* (2014.01)
*E05B 79/10* (2014.01)
(Continued)

(52) U.S. Cl.
CPC ............ *E05B 85/243* (2013.01); *E05B 77/36* (2013.01); *E05B 79/10* (2013.01); *E05B 85/26* (2013.01);
(Continued)

(58) Field of Classification Search
CPC ........ E05B 85/243; E05B 79/10; E05B 85/26; E05B 77/36; Y10T 292/1075;
(Continued)

(56) References Cited

U.S. PATENT DOCUMENTS 4,667,990 A * 5/1987 Quantz .................. E05B 81/14 292/201
5,522,626 A 6/1996 Dominique
(Continued)

FOREIGN PATENT DOCUMENTS

DE 10156200 A1 6/2003
DE 102008061524 A1 6/2010
(Continued)

OTHER PUBLICATIONS

Machine Translation by Lexis Nexis Total Patent of DE10156200A1 on Jun. 20, 2015.
(Continued)

*Primary Examiner* — Kristina R Fulton
*Assistant Examiner* — Faria F Ahmad
(74) *Attorney, Agent, or Firm* — Woodard, Emhardt, Henry, Reeves & Wagner, LLC

(57) ABSTRACT

A lock with a locking mechanism including a rotary latch—preferably at least partially composed of metal—with a load arm and a catch arm, which is rotatably mounted on a catch axis, and which can receive a locking bolt, where the distance between the inner end of the locking bolt and the contact point between locking bolt and load arm is shorter than the distance between the contact point between locking bolt and load arm and the outer end of the locking bolt. The opening forces of a vehicle lock are minimised as a result.

19 Claims, 1 Drawing Sheet

(51) Int. Cl.
*E05B 85/26* (2014.01)
*E05B 77/36* (2014.01)

(52) U.S. Cl.
CPC .......... *Y10S 292/23* (2013.01); *Y10T 292/108* (2015.04); *Y10T 292/1047* (2015.04); *Y10T 292/1075* (2015.04); *Y10T 292/1082* (2015.04); *Y10T 292/1092* (2015.04)

(58) Field of Classification Search
CPC ........... Y10T 292/108; Y10T 292/1082; Y10T 292/1092; Y10T 292/1047; Y10S 292/23
USPC ......... 292/195, 200, 201, 216, 210, DIG. 23
See application file for complete search history.

(56) References Cited

U.S. PATENT DOCUMENTS

| | | | | | |
|---|---|---|---|---|---|
| 6,463,773 | B1 * | 10/2002 | Dimig | E05B 83/36 | 292/201 |
| 6,471,259 | B1 * | 10/2002 | Weyerstall | E05B 81/14 | 292/201 |
| 6,886,869 | B2 * | 5/2005 | Martinez | E05B 17/0029 | 292/129 |
| 7,506,903 | B2 * | 3/2009 | Sattler | B60N 2/20 | 292/216 |
| 7,762,605 | B2 * | 7/2010 | Otsuka | B60N 2/3011 | 296/65.03 |
| 8,226,169 | B2 * | 7/2012 | Kreuels | B60N 2/01583 | 297/378.13 |
| 8,282,141 | B2 * | 10/2012 | Paing | B60N 2/01583 | 292/216 |
| 8,562,040 | B2 * | 10/2013 | Scheffler | E05B 47/0002 | 292/201 |
| 8,672,385 | B2 * | 3/2014 | Matsumoto | B60N 2/366 | 296/65.01 |
| 8,672,386 | B2 * | 3/2014 | Yoo | B60N 2/01583 | 296/65.03 |
| 8,708,377 | B2 * | 4/2014 | Ishikawa | B60N 2/305 | 292/96 |
| 8,727,443 | B2 * | 5/2014 | Vedder | E05B 77/04 | 297/378.13 |
| 9,039,089 | B2 * | 5/2015 | Ohba | B60N 2/366 | 297/378.13 |
| 10,400,488 | B2 * | 9/2019 | Dufay | E05C 3/24 | |
| 2003/0164422 | A1 * | 9/2003 | Collet | B64C 25/26 | 244/102 R |
| 2005/0104384 | A1 * | 5/2005 | Kondo | B60N 2/01583 | 292/240 |
| 2005/0212338 | A1 * | 9/2005 | Muller | B60N 2/01583 | 297/336 |
| 2007/0222250 | A1 * | 9/2007 | Miller | B60N 2/01583 | 296/65.03 |
| 2007/0271973 | A1 * | 11/2007 | Ottino | E05B 85/26 | 70/237 |
| 2010/0026013 | A1 * | 2/2010 | Otsuka | B60N 2/305 | 292/121 |
| 2010/0032967 | A1 * | 2/2010 | Otsuka | B60N 2/01583 | 292/240 |
| 2010/0052394 | A1 * | 3/2010 | Heeg | B60N 2/366 | 297/378.13 |
| 2010/0102614 | A1 * | 4/2010 | Kreuels | B60N 2/919 | 297/378.13 |
| 2010/0133412 | A1 * | 6/2010 | Imajo | B60N 2/305 | 248/503.1 |
| 2011/0169279 | A1 * | 7/2011 | Ishikawa | B60N 2/3011 | 292/96 |
| 2011/0193353 | A1 * | 8/2011 | Schiffer | E05B 77/36 | 292/216 |
| 2011/0260475 | A1 * | 10/2011 | Spurr | E05B 81/14 | 292/195 |
| 2011/0304160 | A1 * | 12/2011 | Kamata | B60N 2/366 | 292/197 |
| 2012/0068480 | A1 * | 3/2012 | Bendel | E05B 85/26 | 292/220 |
| 2012/0080928 | A1 * | 4/2012 | Yoo | B60N 2/01583 | 297/463.1 |
| 2013/0328372 | A1 * | 12/2013 | Suzumura | B60N 2/20 | 297/378.13 |
| 2015/0240536 | A1 * | 8/2015 | Cumbo | E05B 77/06 | 292/200 |
| 2015/0240537 | A1 * | 8/2015 | Cumbo | E05B 77/06 | 292/200 |

FOREIGN PATENT DOCUMENTS

| | | | |
|---|---|---|---|
| DE | 102009026921 | A1 | 12/2010 |
| DE | 102009029014 | A1 | 3/2011 |
| DE | 102009029016 | A1 | 3/2011 |
| DE | 102010003483 | A1 | 3/2011 |
| DE | 102010036924 | A1 | 12/2011 |
| FR | 1039871 | A | 10/1953 |
| FR | 2714415 | A1 | 6/1995 |
| FR | 2 714 415 | | 6/1996 |
| GB | 1 229 228 | | 4/1971 |
| JP | 46013132 | | 5/1971 |
| JP | 03054570 | U | 5/1991 |
| JP | 2003301647 | A | 10/2003 |

OTHER PUBLICATIONS

Machine Translation by Lexis Nexis Total Patent of DE102008061524A1 on Jun. 20, 2015.
Machine Translation by Lexis Nexis Total Patent of DE102009026921A1 on Jun. 20, 2015.
Machine Translation by Lexis Nexis Total Patent of DE102009029014A1 on Jun. 20, 2015.
Machine Translation by Lexis Nexis Total Patent of DE102009029016A1 on Jun. 20, 2015.
Machine Translation by Lexis Nexis Total Patent of DE102010003483A1 on Jun. 20, 2015.
Machine Translation by Lexis Nexis Total Patent of DE102010036924A1 on Jun. 20, 2015.
Machine Translation by Lexis Nexis Total Patent of FR1039871A on Jun. 20, 2015.
Machine Translation by Lexis Nexis Total Patent of FR2714415A1 on Jun. 20, 2015.
Machine translation of JP2003301647A by Patent Translate European Patent Office on Oct. 17, 2019 (pp. 27).
Partial translation of JP03054570U by Total Patent One on Nov. 13, 2019 (pp. 11).

* cited by examiner

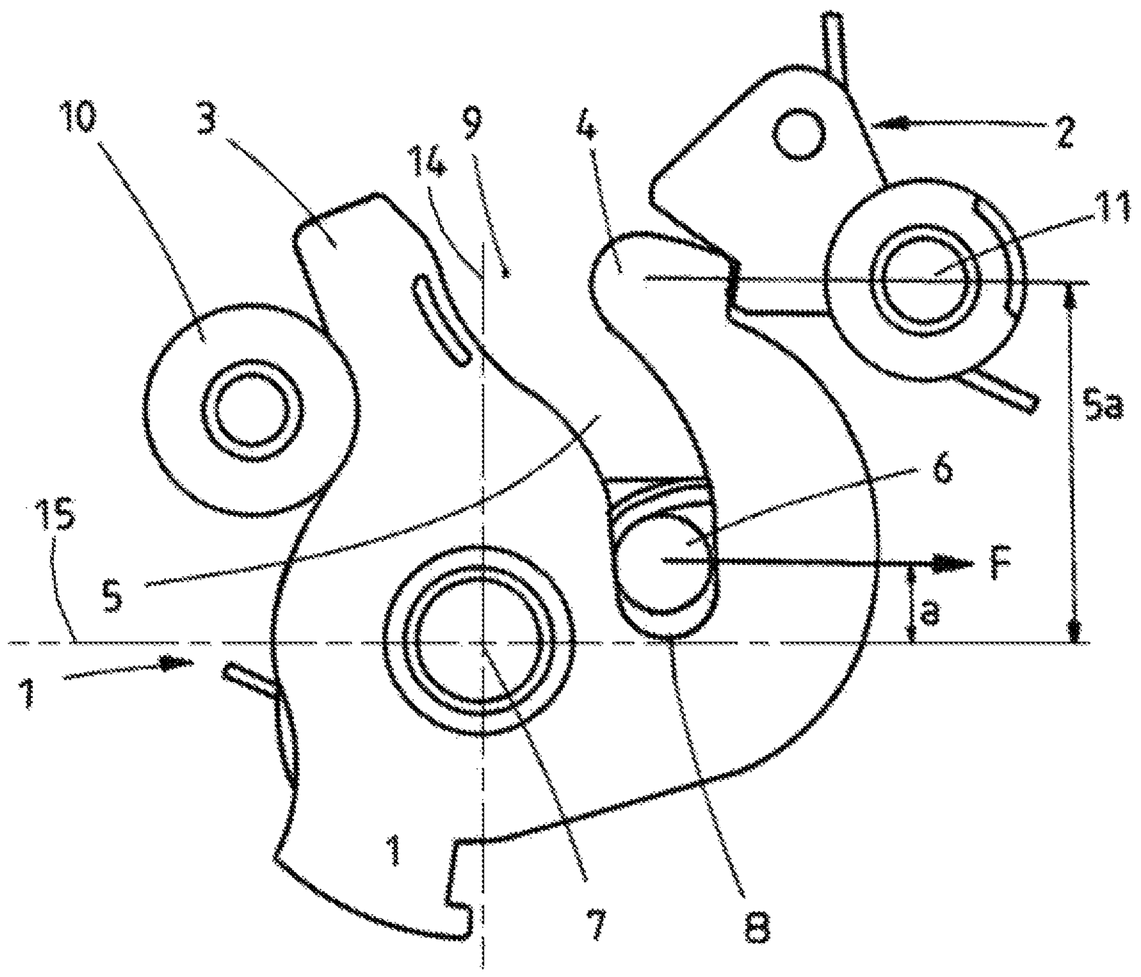
10
3
9
14
4
2
11
5a
6
F
15
5
a
1
1
7
8

VEHICLE LOCK

CROSS-REFERENCE TO RELATED APPLICATIONS

This application is the U.S. national stage application of International Patent Application No. PCT/DE2013/000705, filed Nov. 23, 2013, which claims priority of German Application No. 10 2012 023 261.6, filed Nov. 29, 2012, which are both hereby incorporated by reference.

BACKGROUND

The invention relates to a latch with the characteristics of the generic term of claim 1.

A latch for a motor vehicle contains a locking mechanism with a rotatably mounted catch for receiving a locking bolt, also referred to as latch holder. The locking mechanism also contains a pawl into which a catch can engage for retaining the locking bolt.

The catch of a motor vehicle latch usually contains a fork-like inlet slot (also referred to as infeed section) formed by the load arm and catch arm, entered by a locking bolt of a motor vehicle door or flap, i.e. bonnet or tailgate, when the door of flap is closed. The locking bolt or latch holder then rotates the catch from an opening position in the direction of the closing position until the pawl latches the catch. This position is referred to as latching position. The locking bolt is then unable to leave the inlet slot of the catch.

Generally, motor vehicle door latches contain one or two latching positions, an pre-ratchet position and a main-ratchet position. The pre-ratchet position serves to catch the respective door or flap, if it does not reach the main-ratchet position during closing. If the catch is rotated further from the pre-ratchet position it finally reaches the main-ratchet position.

For reasons of ease of operation it is desirable that vehicle latches can be opened with little force. In the main-ratchet position, the force required for opening depends, amongst other things, on a lever ratio between the pivot point of the catch and main-Second ratchet position (first lever) and between the pivot point of the catch and contact area or contact point between the locking bolt and the load arm (second lever). The first lever starts at the centre of the catch and extends perpendicularly in the direction of the force, along which the load arm of the catch in the main-ratchet position presses against the pawl. The second lever starts at the centre of the catch axis. If the locking mechanism is in the main-ratchet position, the locking bolt exerts a force, whose direction forms a right angle with the second lever, as shown in FIG. 1 of DE 10 2009 029 016 A1. The second lever ends on the level of the force arrow.

The length ratio between the first and second lever is referred to as blatching element ratio. The greater the blatching element ratio, the lower the force required for unlatching a locking mechanism.

DE 10 2009 029 016 A1 FIG. 1 discloses a locking mechanism fixed to a metal plate of a latch case in which the blatching element ratio is 3. The load arm of the catch is clearly wider than the catch arm. The catch arm narrows at its open end, as the least force is exerted on this end, saving on material and weight. In contrast, the load arm is thicker towards its open end, allowing arrangement of a detent surface for the pre-ratchet position and of a detent surface for the main-ratchet position on the load arm.

The pawl of the locking mechanisms is arranged adjacent to a lateral latch case wall so that the pawl can support itself against this latch case wall, if exposed to a considerable force in case of a crash.

In order to attain a favorable blatching element ratio, printed matter DE 10 2009 029 014 A1 suggests minimizing the distance between the locking bolt and the axis of the catch in the main-ratchet position. Such options are, however, limited for reasons of stability.

In latches disclosed in printed matter DE 10 2009 029 014 A1 and DE 10 2009 029 016 A1, containing locking mechanisms, the axis of the catch is located in the area connecting the load and catch arm and seen from the side with the externally located end of the infeed section along the second lever behind the inner end of the infeed section. Such an arrangement of the axis of a catch is also known from printed matters DE 10 2009 026 921 A1 and DE 10 2010 003 483 A1.

The internally arranged or inner end of the infeed section refers to the end seen from said contact area or contact point between the locking bolt and the load arm located at the bottom of the catch inlet slot. The outer end refers to the end seen from said contact point between the locking bolt and load arm that lies in the direction of the opening of the inlet slot of the catch.

In contrast, printed matters DE 10 2007 585 A1 and DE 10 2010 036 924 A1 disclose a laterally offset arrangement of the catch axis relative to the inner end of the infeed section when viewed along the second lever from the side with the external inlet section end. In addition, the catch axis and inner infeed section are, in this context, still arranged behind each other.

SUMMARY

The described characteristics of the latch can be individually or in any combination combined with the invention unless expressly specified differently below.

The invention has the task of providing a latch with the characteristics of the first claim. Advantageous embodiments are disclosed in the sub-claims.

In order to solve this task, claim 1 discloses a locking mechanism comprising a catch with a load arm and a catch arm, rotatably mounted on a catch axis and able to receive a locking bolt. Viewed from the side with the externally situated end of the infeed section along the second lever, the catch axis is arranged as in prior art embodiments disclosed in printed matter DE 10 2007 585 A1 and DE 10 2010 036 924 A1 laterally offset next to the inner end of the infeed section. In contrast there are, however, areas of the catch axis and inner end of the infeed section that are arranged next to each other. Advantageously there is also an area of the catch axis, arranged before the inner end of the infeed section. In this latter embodiment, the axis of the catch extends into the catch arm area.

It is thus possible to reduce the size of the second lever to any size without endangering the mechanical stability. As a result, favorable blatching element ratios of, for instance, at least 4 can be achieved without requiring an excessively large installation space for the locking mechanism. It is easily possible to provide a blatching element ratio of five or more, in order to disengage the locking mechanism with little force.

In one embodiment of the invention, the centre of the catch axis in the aforementioned context is located behind the inner end of the inlet module of the catch or on the level of the inner end. It is thus ensured that the length of the second lever differs suitably from zero in order to be able to turn the catch in the opening direction with the aid of the locking bolt.

As, in the main-ratchet position, the pressure exerted on the pawl is low due to a favorable blatching element ratio of four, five or more, said pawl is subjected to little mechanical stressing. In an advantageous embodiment it is therefore possible to manufacture the pawl from plastic without adversely affecting the stability of the locking mechanism. For reasons of stability, the axis of the pawl is, however, advantageously made of metal but can have a smaller diameter than usual. This saves on material and space. By using a plastic pawl, the weight and required production work is advantageously reduced. The use of a plastic pawl is also advantageous as regards generated noise, as it is reduced and, in particular, the so-called opening plopping. If the weight of the pawl is reduced, an optionally provided pretensioned spring for the pawl can be weaker, advantageously reducing mechanical stressing. An optionally provided pretensioned spring for the pawl can move the pawl, in particular, into its latched position.

In one embodiment of the invention, parts of the infeed section are arched around the catch axis and, in particular, the part containing the inner end of the infeed module. As a result, the axis of rotation of the pawl can thus be arranged at an adequate distance away from the centre axis of the latch holder or of the locking bolt. This embodiment offers the additional advantage of the catch being mechanically stable despite of its small design. This design also makes it possible for the catch to be pivoted by less than 90°, in order to move from its opening position to the main-ratchet position and vice versa. Small pivoting movements are advantageous and, in particular, for quick and quiet opening and closing with minimum effort and for being able to keep the installation space to a minimum.

It has also been demonstrated that the guiding of the locking bolt, corresponding to the arched route, reduces the amount of noise generated during opening and closing. Said guiding reduces noise, irrespective of the arrangement of the axis of rotation of the catch. The guides thus represent an independent technical teaching for advantageously reducing noise. A guide in the context of the invention means a parallel arrangement of two restrictions located opposite each other, i.e. the respective opposite lateral contours of the load arm and catch arm. The width of a guide is, in particular, only slightly larger than the diameter of a locking bolt, in order to reduce the noise and keep the installation space to a minimum. Already with a guide extending at least over 5 mm, considerable noise reductions can be attained. It has also been shown that together with higher blatching element ratios, noise levels can be reduced further.

In one embodiment, the part of the infeed section, containing the outer end of the infeed section features an arched section, i.e. a reversed arched section in comparison to a part provided in one embodiment, extending arch-shaped around the catch axis. This embodiment provides an even more mechanically stable but yet small design of the catch. Another improvement is that the catch has to be pivoted by less than 90° in order to move it from its opening position to the main catch position and vice versa.

In one embodiment the latch is integrated, in particular, in a door in such a way that the inner end of the infeed section is below the top end of the infeed section in the main catch position. The axis of the catch is then below the latch holder in the main catch position, when the latch is integrated in a door. This embodiment prevents a force being transferred to the pawl due to the weight of the door which would cause adverse mechanical stressing. This also reduces the danger of soiling.

Below, the invention is explained in more detail based on an advantageous embodiment shown in one FIGURE.

To engage with the catch, the pawl can engage with the load arm or catch arm.

When installed, the outer end of the infeed section of the catch can lie above the internal end or also underneath it. The arrangement will be chosen to match the available installation space.

The blatching element ratio of the object of the invention is preferably greater than three and particularly preferably greater than five. It has been demonstrated that the invention can provide actual blatching part ratios of 5.5 to 6.5. Blatching element ratios of up to 7 are generally possible. Blatching element ratios exceeding 7 are also possible but generally require an unwanted larger installation space.

High blatching element ratios advantageously allow the use of a low-powered closing aid.

Preferably, the latch holder is held by a bracket.

BRIEF DESCRIPTION OF THE DRAWING

FIG. 1 shows the locking mechanism in the main-ratchet position.

DETAILED DESCRIPTION OF THE DRAWING

FIG. 1 shows a catch 1 into which a pawl 2 engages. The catch contains a catch arm 3 and a load arm 4, forming an inlet slot 5. The inlet slot 5 holds a latch holder or cotter pin 6. The latch holder 6 is pulled in the direction indicated by the arrow by a force F as a result, of for instance, a door sealing pressure. The load arm 4 does, however, prevent the latch holder 6 from being moved out of the locking mechanism by the force F. FIG. 1 also shows longitudinal axis 14 and horizontal axis 15 that is perpendicular to longitudinal axis 14. Horizontal axis 15 is parallel to the vector of force F. Longitudinal axis 14 extends between catch arm 3 and load arm 4 in the region of the outer end 9 of the inlet slot 5 that receives latch holder 6.

The catch 1 is rotatably mounted by an axis 7. This axis 7 of the catch 1 partially extends into the area of the catch arm 3 and is therefore in parts, arranged next or in front of the inner end 8 of the infeed section 5 as seen along a perpendicular direction to the force arrow F as well as seen from the outer end 9 of the inlet section 5.

The arrangement of the catch 1 shown in FIG. 1 corresponds to an installed state in the door, so that the outer end 9 of the infeed section 5 lies above the inner end 8.

FIG. 1 shows a stop 10 preventing an excessive pivoting movement of the catch 1 in counter-clatchwise direction and thus starting from the opening position of the catch 1 in the direction of the closing position.

If the pawl 2 is pivoted around its axis 11 in clatchwise direction, the pawl moves out of its latched position. The catch 1 can then be turned or pivoted clatchwise in the direction of the opening position. Once the catch 1 has reached its opening position, the latch holder 6 can leave the locking mechanism. The stop 10 also restricts this pivoting movement of the catch 1 in clatchwise direction, i.e. pivoting to open the locking mechanism.

By arranging a section of the axis 7 next to the inner end 8 of the infeed section 5, a very small distance a between the centre of the catch axis and contact area between the latch holder 6 and the load arm 4 and in perpendicular direction to the force arrow F, can be provided. The thus provided small second lever a starts at the centre of the catch axis 7, extends perpendicularly into the force arrow F in the shown main-ratchet position, where it also ends. FIG. 1 shows the scenario in which the centre of the catch axis is located at the height of the inner end 8 of the infeed section, as indicated by the drawn line.

The distance of axis 7 to the inner end 8 is similar to the distance between the rotation axis 7 and the left edge of the catch or of the catch arm 3. The axis 7 is thus at least approximately arranged at the centre between the inner end 8 of the infeed section 5 and the facing outer edge of the catch arm. This optimizes mechanical stability and the strength of the catch arm with optimum material use.

In order to further improve material usage, the catch arm 3 is, as shown, wider than the load arm 4 at the level of the inner end at the axis of rotation 7. Preferably, the catch arm is 1.5 to 2.5 times wider than the load arm in this area. At the free end adjacent to the open, external end 9 of the infeed section 5, the catch arm and load arm are, however, advantageously of a similar width, as shown, in order to minimize the use of material and thus weight and required installation space. The width of the catch arm 3 is equal to the width of the load arm 4.

The first lever extends, as shown by the illustrated gap 5*a*, in such a way that the locking mechanism shown in FIG. 1 has a blatching element ratio of 5.

Starting from the inner end 8, the infeed section 5 initially extends in an arch-shape around the catch axis 7 and up to about half of the infeed section 5. The subsequent section of the infeed section extends in an opposite arch-shape up to the external end 9 of the infeed section. This design contributes to optimizing material usage for achieving the mechanical stability. These arch-shaped arrangements formed by parallel lateral restrictions or contours of load arm 4 and catch arm 3 guide the locking bolt 6 for more than 5 mm. This guide results in a considerable noise reduction.

The following reference numerals are used in the FIGURES:

1: catch
2: pawl
3: catch arm of catch
4: Load arm of catch
5: infeed section, inlet slot of catch
6: locking bolt, latch holder
7: axis of catch
8: inner end of inlet section
9: external end of inlet section
10: stop
11: axis of pawl
12: holding element
F: force arrow

The invention claimed is:

1. A latch for a motor vehicle with a locking bolt and with a locking mechanism, the latch comprising:

a catch with an axis, a load arm, and a catch arm, wherein the catch defines an infeed slot between the load arm and the catch arm adapted to receive the locking bolt;

wherein the infeed slot has an outer end corresponding to the beginning of the infeed slot;

wherein the infeed slot has an inner end corresponding to the furthest point from the outer end that the locking bolt can be received;

wherein the catch defines a first arched section of the infeed slot between the outer and inner ends of the infeed slot that arches around the axis of the catch;

wherein the catch defines a longitudinal axis that extends from the axis through the outer end of the infeed slot between the load arm and the catch arm;

wherein the catch defines a horizontal axis that extends from the axis perpendicularly to the longitudinal axis; and wherein the inner end of the infeed slot is aligned with the horizontal axis and the inner end of the infeed slot is horizontally offset from the axis of the catch.

2. The latch according to claim 1, wherein the centre of the catch axis is arranged behind the inner end of the infeed section or at the level of the inner end when viewed from the outer end of the infeed section.

3. The latch according to claim 1, further comprising a pawl is made of plastic with an axis of the pawl being made of metal.

4. A latch for a motor vehicle with a locking bolt and with a locking mechanism containing a rotatably mounted catch according to claim 1 with a load arm and a catch arm of an infeed section and a pawl for latching the catch wherein the catch defines a second arched section of the infeed slot between the outer end and the first arched section, wherein the second arched section curves opposite the first arched section.

5. The latch according to claim 1, wherein the infeed section contains a guide for the locking bolt, the guide having a length of at least 5 mm.

6. The latch according to claim 1, wherein the catch is designed in such a way that the inner end of the infeed section is arranged below a top end of the infeed section in the main-ratchet position.

7. The latch according to claim 1, wherein the width of the catch arm in the area of the catch axis is greater than the width of the load arm.

8. The latch according to claim 1, wherein the width of the catch arm at the outer end of the infeed section of the catch is equal to the width of the load arm.

9. The latch according to claim 2, further comprising a pawl that is made of plastic with an axis of the pawl being made of metal.

10. A latch for a motor vehicle with a locking bolt and with a locking mechanism containing a rotatably mounted catch according to claim 9 with a load arm and a catch arm of an infeed section and a pawl for latching the catch wherein the catch defines a second arched section of the infeed slot between the outer end and the first arched section, wherein the second arched section curves opposite the first arched section.

11. The latch according to claim 10, wherein the infeed section contains a guide for the locking bolt, the guide having a length of at least 5 mm.

12. The latch according to claim 11, wherein the catch is designed in such a way that the inner end of the infeed section is arranged below a top end of the infeed section in the main-ratchet position.

13. The latch according to claim 12, wherein the width of the catch arm in the area of the catch axis is greater than the width of the load arm.

14. The latch according to claim 13, wherein the width of the catch arm at the outer end of the infeed section of the catch is equal to the width of the load arm.

15. The latch according to claim 5, wherein the catch is designed in such a way that the inner end of the infeed section is arranged below a top end of the infeed section in the main-ratchet position.

16. The latch according to claim 5, wherein the width of the catch arm in the area of the catch axis is greater than the width of the load arm.

17. The latch according to claim 1, wherein a latching element ratio is the length ratio between a first lever and a second lever, wherein the first lever extends between the pivot point of the catch and a main-ratchet area of the catch, wherein the second lever extends between the pivot point of the catch and a contact area or a contact point between the locking bolt and the load arm and wherein the latching element ratio is 3 to 7.

18. The latch according to claim 1, wherein the load arm defines a second infeed surface, wherein the first and second infeed surfaces extend opposite to one another between the inner and outer ends of the infeed section.

19. The latch according to claim 18, wherein a part of the second infeed surface is arch shaped.

* * * * *